(12) United States Patent
Stadler et al.

(10) Patent No.: US 8,280,647 B2
(45) Date of Patent: Oct. 2, 2012

(54) METHOD AND SYSTEM FOR MONITORING PROCESS STATES OF AN INTERNAL COMBUSTION ENGINE

(75) Inventors: Konrad Stadler, Niederweningen (CH); Andreas Poncet, Grandvaux (CH); Thomas Von Hoff, Niederrohrdorf (CH)

(73) Assignee: ABB Research Ltd, Zurich (CH)

( * ) Notice: Subject to any disclaimer, the term of this patent is extended or adjusted under 35 U.S.C. 154(b) by 302 days.

(21) Appl. No.: 12/480,411

(22) Filed: Jun. 8, 2009

(65) Prior Publication Data
US 2009/0281737 A1 Nov. 12, 2009

Related U.S. Application Data

(63) Continuation of application No. PCT/EP2007/063518, filed on Dec. 7, 2007.

(30) Foreign Application Priority Data

Dec. 7, 2006 (EP) ..................................... 06405509

(51) Int. Cl.
*G01B 3/00* (2006.01)
(52) U.S. Cl. ..................... 702/33; 73/114.52; 73/114.53; 123/478
(58) Field of Classification Search .................... 702/23, 702/24, 33, 44, 50, 104, 105, 113, 114, 116, 702/123, 145, 183; 123/1 A, 674, 695, 704, 123/478; 502/303; 73/114.52, 114.53
See application file for complete search history.

(56) References Cited

U.S. PATENT DOCUMENTS 3,898,962 A 8/1975 Honig et al.
(Continued)

FOREIGN PATENT DOCUMENTS

EP 1 233 165 A1 8/2002

OTHER PUBLICATIONS

Form PCT/ISA/210 (International Search Report) dated Mar. 12, 2008.
(Continued)

*Primary Examiner* — John H Le
(74) *Attorney, Agent, or Firm* — Buchanan Ingersoll & Rooney PC

(57) ABSTRACT

For monitoring (unmeasured) process states of a rotating machine having a combustion chamber (e.g. a gas turbine), compositions of educts entering the combustion chamber are measured. Based on the compositions of the educts, the composition of the product produced by the combustion chamber can be determined. Moreover, the mechanical power ($P_{mech}$) generated by the rotating machine can be determined. Based on the mechanical power ($P_{mech}$), the composition of the educts and product, and stoichiometric relationships of educts and product, the values of process states, such as the air mass flow ($w_a$) through the compressor leading into the combustion chamber and/or the gas mass flow ($w_g$), the composition and/or the temperature ($T_3$) of exhaust gas exiting the combustion chamber can be determined. Based on precise measurements of the educt (e.g. the composition of air and fuel in the combustion process), the product (i.e. the composition of the exhaust gas and its temperature) is derived and, without the need of an iterative or recursive method, the turbine inlet temperature ($T_3$) can be monitored and controlled.

10 Claims, 3 Drawing Sheets

U.S. PATENT DOCUMENTS

| | | | |
|---|---|---|---|
| 4,094,142 A | 6/1978 | Pfefferle | |
| 4,096,839 A | 6/1978 | Niertit | |
| 4,517,948 A | 5/1985 | Kaji et al. | |
| 4,596,220 A * | 6/1986 | Oosuga et al. | 123/478 |
| 4,945,882 A | 8/1990 | Brown et al. | |
| 5,015,616 A * | 5/1991 | Sekido et al. | 502/303 |
| 5,157,613 A | 10/1992 | Williams et al. | |
| 6,612,269 B2 * | 9/2003 | Heffel et al. | 123/1 A |
| 6,938,466 B2 * | 9/2005 | Bonadies et al. | 73/114.53 |
| 7,797,994 B2 * | 9/2010 | Sterner | 73/114.52 |
| 2002/0143477 A1 | 10/2002 | Antoine et al. | |

OTHER PUBLICATIONS

Form PCT/IPEA/409 (International Preliminary Report on Patentability) dated Jan. 20, 2009.

European Search Report dated Jun. 21, 2007.

* cited by examiner

METHOD AND SYSTEM FOR MONITORING PROCESS STATES OF AN INTERNAL COMBUSTION ENGINE

RELATED APPLICATIONS

This application claims priority as a continuation application under 35 U.S.C. §120 to PCT/EP2007/063518, which was filed as an International Application on Dec. 7, 2007 designating the U.S., and which claims priority to European Application 06405509.8 filed in Europe on Dec. 7, 2006. The entire contents of these applications are hereby incorporated by reference in their entireties.

FIELD

The present disclosure relates to the field of control and instrumentation technology for internal combustion engines, and/or for rotating machines. Exemplary embodiments relate to methods and systems for monitoring process states of a rotating machine with a combustion chamber, including turbo machines such as gas turbines.

BACKGROUND INFORMATION

Internal combustion engines such as rotating machines (e.g. turbo machines such as gas turbines), or reciprocating machines (e.g. diesel engines), are subject to considerable loads. Creep and fatigue can affect the machines in extreme conditions owing to very high combustion temperatures, pressure ratios, and air flows. As a consequence of their deterioration, the main components of a gas turbine (GT), e.g., the inlet nozzle, the compressor, the combustion chamber, the turbine, the air flow cooler, and the outlet, can all contribute—to a different extent—to the degradation of GT performance. The condition of each single component invariably deteriorates with operation time, until it is at least partially restored by some maintenance action.

A goal of gas turbine performance diagnosis is to accurately detect, isolate and assess performance changes, system malfunctions and instrumentation problems. Among a number of other techniques, Gas Path Analysis (GPA), as disclosed for instance in EP-A 1 233 165, is a known framework for estimating shifts in performance from the knowledge of measured parameters, such as power, engine speeds, temperatures, pressures or fuel flow, taken along the gas path of the turbine. Discernable shifts in these measured parameters provide information for determining the underlying shift in engine operation from a presumed reference, nominal or initial state, i.e. the degradation symptoms. GPA allows engine performance deterioration to be identified in terms of a degradation of independent parameters or system states such as thermodynamic efficiencies, flow capacities and inlet/outlet filter areas. In a subsequent diagnosis step, these degradation symptoms are analysed and a maintenance action schedule is deduced, for ensuring economic and safe operation, or a prediction of the remaining life of the major components is made. The origin of a fault affecting a given component of the gas turbine can be of various natures, such as a contamination of compressor blades, erosion of turbine blades or corrosion of machine parts, for example. Conversely, different faults often create similar observable effects or degradation symptoms.

Accordingly, for the operation of a GT, it can be important to know exactly the main process states such as temperatures, pressures or fluid mass flow, before and after each component. Specifically, the turbine inlet temperature is constrained to an upper limit, as high temperatures let the turbine blades deteriorate faster than lower temperatures, thereby reducing the life time of the GT. On the other hand, for fuel efficient operation of a GT, high temperatures are desired. Therefore, the turbine inlet temperature is controlled tightly. However, in many GT's the turbine inlet temperature is not measured but derived from other measurable states, which can produce uncertainty on the controlled variable. Reliable methods to derive turbine inlet temperatures are therefore desired for operating a GT efficiently. Precise knowledge of these unmeasured states makes it possible to better estimate the operating conditions and, therefore, to better predict maintenance scheduling.

Known methods of determining unknown process states use a dynamic or static model. These models are based on thermodynamic and fluid mechanical principles. Model-based techniques make use of Kalman filter techniques for the online estimation of the unknown states or use iterative methods (e.g. Newton-Raphson), such as described in EP 1 233 165. However, these methods can be impacted negatively in that the fluid flowing through the GT can influence considerably the unmeasured states, e.g. ambient humidity (in form of vapour) cools the turbine inlet temperature owing to the vaporization energy. Often this effect is compensated by applying empirical correction curves. This effect is also used to lower the temperature in the combustion chamber in order to reduce $NO_X$ emission when the GT is operated with liquid fuel (oil) instead of gaseous fuel. Generally, the combustion is not modelled and, therefore, the composition of air (influenced by the ambient humidity) and of the exhaust gas (influenced by fuel and air composition) and the corresponding mass flows are not considered.

The disclosures set forth in the documents mentioned herein are incorporated by reference in their entireties.

SUMMARY

A method is disclosed of monitoring at least one process state of an internal combustion engine having a combustion chamber, the method comprising: measuring compositions of educts ($m_a$, $m_f$) entering a combustion chamber; determining, based on the compositions of the educts ($m_a$, $m_f$), a composition of a product produced by the combustion chamber; determining mechanical power ($P_{mech}$) generated by the internal combustion engine; and determining a value of at least one process state based on the mechanical power ($P_{mech}$), the composition of the educts ($m_a$, $m_f$) and product, and stoichiometric relationships of educts and product.

A system is disclosed for monitoring at least one process state of an internal combustion engine having a combustion chamber, the system comprising: means for measuring compositions of educts ($m_a$, $m_f$) entering the combustion chamber; means for determining based on the compositions of the educts ($m_a$, $m_f$) a composition of a product produced by the combustion chamber; means for determining mechanical power ($P_{mech}$) generated by the internal combustion engine; and means for determining a value of at least one process state based on the mechanical power ($P_{mech}$), the composition of the educts ($m_a$, $m_f$) and product, and stoichiometric relationships of educts and product.

BRIEF DESCRIPTION OF THE DRAWINGS

The present disclosure will be explained in more detail, by way of example, with reference to the drawings in which.

DETAILED DESCRIPTION

Figure 1:
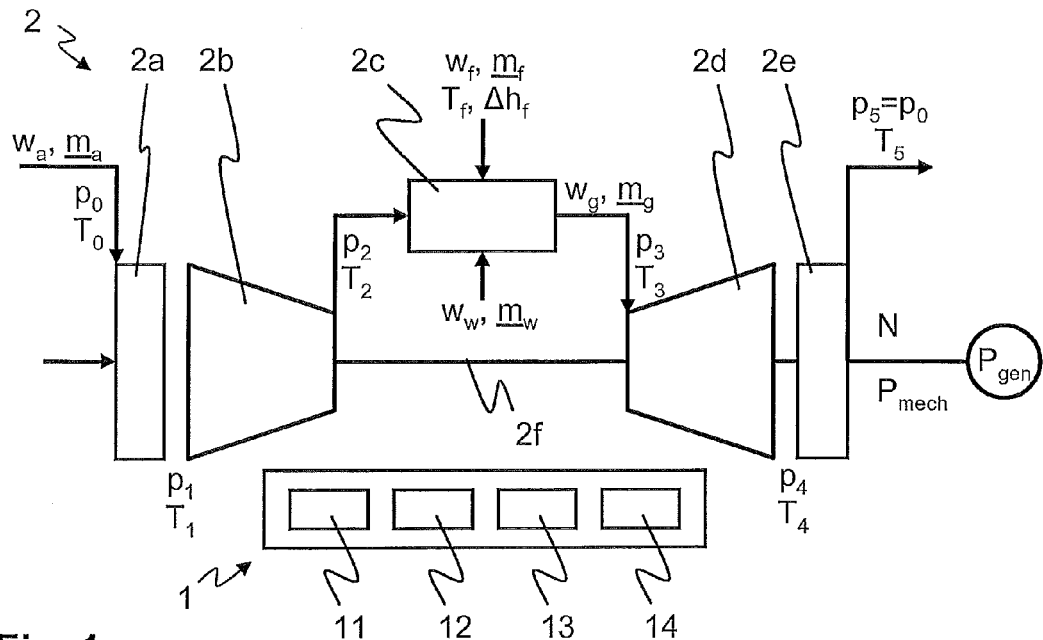
FIG. 1 shows an exemplary block diagram illustrating schematically a gas turbine and exemplary process states.

A method and a system are disclosed for monitoring unmeasured process states of an internal combustion engine, for example of a rotating machine having a combustion chamber such as a turbo machine (e.g., a gas turbine). Exemplary embodiments of the present disclosure can provide a method and a system for determining more accurately than with known methods the turbine inlet temperature of a gas turbine. Exemplary embodiments of the present disclosure can determine unmeasured process states such as air mass flow, exhaust gas mass flow and turbine inlet pressure, for assessing efficiency of the gas turbine.

According to the present disclosure, exemplary embodiments are provided for monitoring (unmeasured) process states of a rotating machine having a combustion chamber, and measuring compositions of educts entering the combustion chamber. Based on the compositions of the educts, the composition of the product produced by the combustion chamber can be determined. Moreover, the mechanical power generated by the rotating machine can be determined. For example, the mechanical power can be determined based on characteristics of a generator driven by the rotating machine and based on the measured power generated by the generator. Based on the mechanical power, the composition of the educts and product, and stoichiometric relationships of educts and product, the value of at least one of the process states can be determined and, for example, displayed and/or provided to a control unit controlling the rotating machine.

Thus, in exemplary embodiments, based on precise measurements of the educt (e.g. the composition of air and fuel in the combustion process), the product (i.e. the composition of the exhaust gas) can be derived, assuming complete combustion, which is very reasonable at least for gaseous fuel. Subsequently, without the need of an iterative or recursive method, making possible a more robust and faster implementation, various unmeasured process states can be determined (e.g. the air mass flow through the compressor leading into the combustion chamber and/or a gas mass flow, a composition and/or a temperature of exhaust gas exiting the combustion chamber). For example, in addition to monitoring unmeasured process states (e.g. through implementation on an industrial control system), it is possible to control the turbine inlet temperature based on a more accurate estimate thereof. The proposed exemplary method and system are applicable to any rotating machinery where combustion is involved (e.g. a gas turbine, a diesel engine, an internal combustion engine, etc.).

For example, for monitoring the process states of a gas turbine, the air mass flow through the compressor leading into the combustion chamber can be determined. Based on the air mass flow and the fuel mass flow into the combustion chamber, the gas mass flow of exhaust gas exiting the combustion chamber can be determined. Based on the air mass flow and the gas mass flow, the composition of the exhaust gas can be determined. Based on the air mass flow, the gas mass flow, and the composition of the exhaust gas, the temperature of the exhaust gas exiting the combustion chamber can be determined. The temperature of the exhaust gas exiting the combustion chamber can be representative of the inlet temperature of the turbine that is driven by the exhaust gas exiting the combustion chamber.

Temperatures of educts and product can be measured, and, based on their respective temperatures, enthalpies for educts and product can be determined using enthalpy functions associated with their respective compositions. In the example of monitoring the process states of the gas turbine, measured are the temperatures of air and fuel entering the combustion chamber, and the temperature of the exhaust gas exiting the turbine. Subsequently, enthalpies for air, fuel and exhaust gas can be determined based on their respective temperatures, and the value of the at least one of the process states is based on the enthalpies.

In an exemplary embodiment, an inverted enthalpy function associated with the composition of the exhaust gas can be determined. Subsequently, the temperature of the exhaust gas exiting the combustion chamber is determined based on the air mass flow and the gas mass flow using the inverted enthalpy function.

Figure 2:
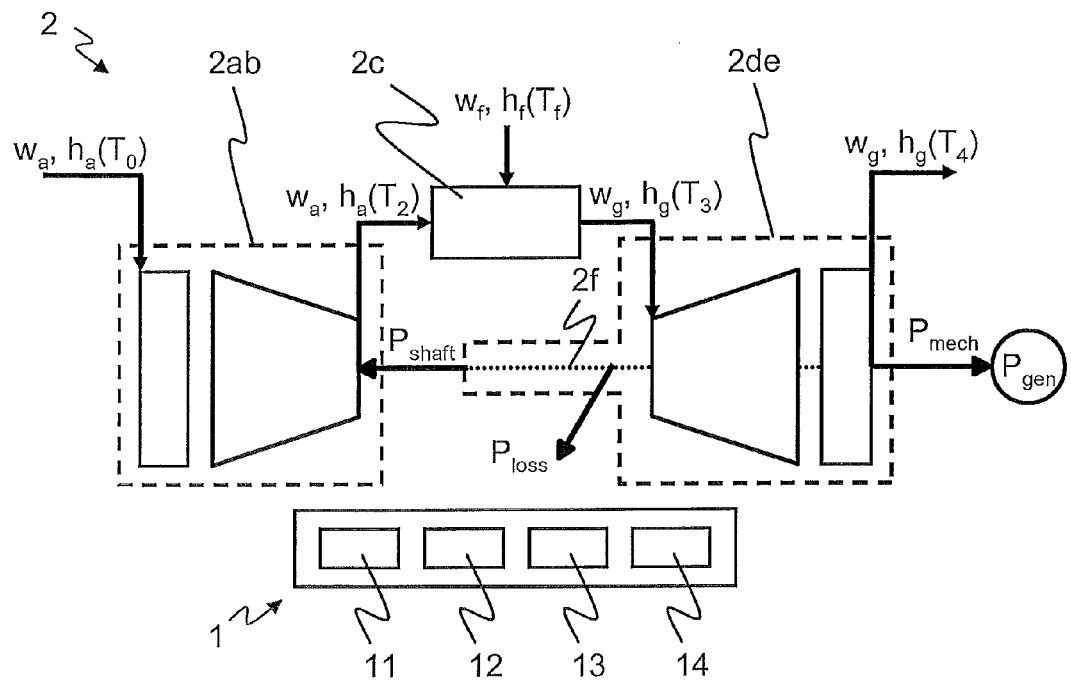
FIG. 2 shows a block diagram illustrating schematically exemplary thermodynamic boundaries of a gas turbine.

FIG. 1 shows exemplary principal components of a rotating machine 2, particularly a gas turbine, viewed as a system comprising (e.g., consisting of) a sequential arrangement of ideal volume elements in thermodynamic equilibrium, i.e. compressor inlet 2a (filter, nozzle), compressor 2b, combustion chamber 2c, turbine 2d and outlet conduit 2e, wherein compressor 2b and turbine 2d are mechanically interconnected by a shaft 2f. FIG. 1 also depicts the places where the various dependent or system output variables, i.e. the process variables such as temperatures, pressures, power and shaft speed, are measured. These variables comprise the temperature $T_0$ at the entry to the compressor inlet 2a, as well as the compressor inlet and outlet temperature and pressure denoted $T_1$, $p_1$ and $T_2$, $p_2$, respectively. Further along the gas path, turbine inlet and outlet temperature and pressure are denoted $T_3$, $p_3$ and $T_4$, $p_4$, respectively, whereas the exhaust gas finally has a variable temperature $T_5$ and a pressure $p_5$ (usually $p_5$ can be assumed to be equal to the ambient pressure $p_0$). In addition, the shaft speed N, mechanical power $P_{mech}$ and generator power $P_{gen}$ are known output variables. In FIGS. 1 and 2, indices a, f, g, and w refer to air, fuel, exhaust gas, or water, respectively. Thus reference numerals $w_a$, $w_f$, $w_g$, $w_w$ refer to air mass flow, fuel mass flow, exhaust gas mass flow, or water mass flow, respectively; reference numerals $\underline{m}_a$, $\underline{m}_f$, $\underline{m}_g$, $\underline{m}_w$ refer to the specific compositions of air, fuel, exhaust gas, or water, respectively; and reference numerals $h_a$, $h_f$, $h_g$ refer to the enthalpy at specific temperatures $T_i$ of air, fuel, or exhaust gas, respectively.

The main unmeasured process states can be used to monitor and/or control efficient operation include the turbine inlet temperature $T_3$, the air mass flow $w_a$, and the exhaust gas mass flow $w_g$. The turbine inlet pressure $p_3$ can also be determined. Additionally, the exhaust gas composition may be of interest for regulatory reasons (e.g. $CO_2$ emission). These unmeasured process states can be derived from the measurable states, as will be explained in the following paragraphs.

FIG. 2 shows schematically the thermodynamic system boundaries 2ab, 2de of the gas turbine, boundary 2ab encompassing compressor inlet 2a and compressor 2b, and boundary 2de encompassing turbine 2d and outlet conduit 2e.

Generally, the losses can be quantified with sufficient accuracy and can be combined and described by one power term $P_{loss}$ which is assumed to be known. The mechanical power $P_{mech}$ generated by the turbine 2d can be derived, for example, from the generator characteristics and the measured generator power $P_{gen}$. Using the system boundaries as defined in FIG. 2, the following relations can be derived:

$$P_{mech} = w_g \cdot h_g(T_3) - w_g \cdot h_g(T_4) - P_{shaft} - P_{loss} \quad (1)$$

$$-P_{shaft} = w_a \cdot h_a(T_0) - w_a \cdot h_a(T_2) \quad (2)$$

$$P_{mech} = w_g \cdot [h_g(T_3) - h_g(T_4)] - w_a \cdot [h_a(T_2) - h_a(T_0)] - P_{loss} \quad (3)$$

The enthalpies for air, fuel and exhaust gas, $h_{(\cdot)}(T_{(\cdot)})$, can be derived by considering their specific composition $\underline{m}_{(\cdot)}$ and by using the enthalpy functions $\underline{h}_{(\cdot)}(T_{(\cdot)})$ published by NASA as polynomials which describe the enthalpy of the main elements. The polynomials are taken from http://cea.grc.nasa.gov/, which is a tool provided by the NASA Glenn Research Center under the title "Chemical Equilibrium with Applications". The desired polynomials can be generated and downloaded as $$h_{(\cdot)}(T_{(\cdot)}) = \underline{m}_{(\cdot)}^T \cdot \underline{h}(T_{(\cdot)}). \quad (4)$$

Figure 4:
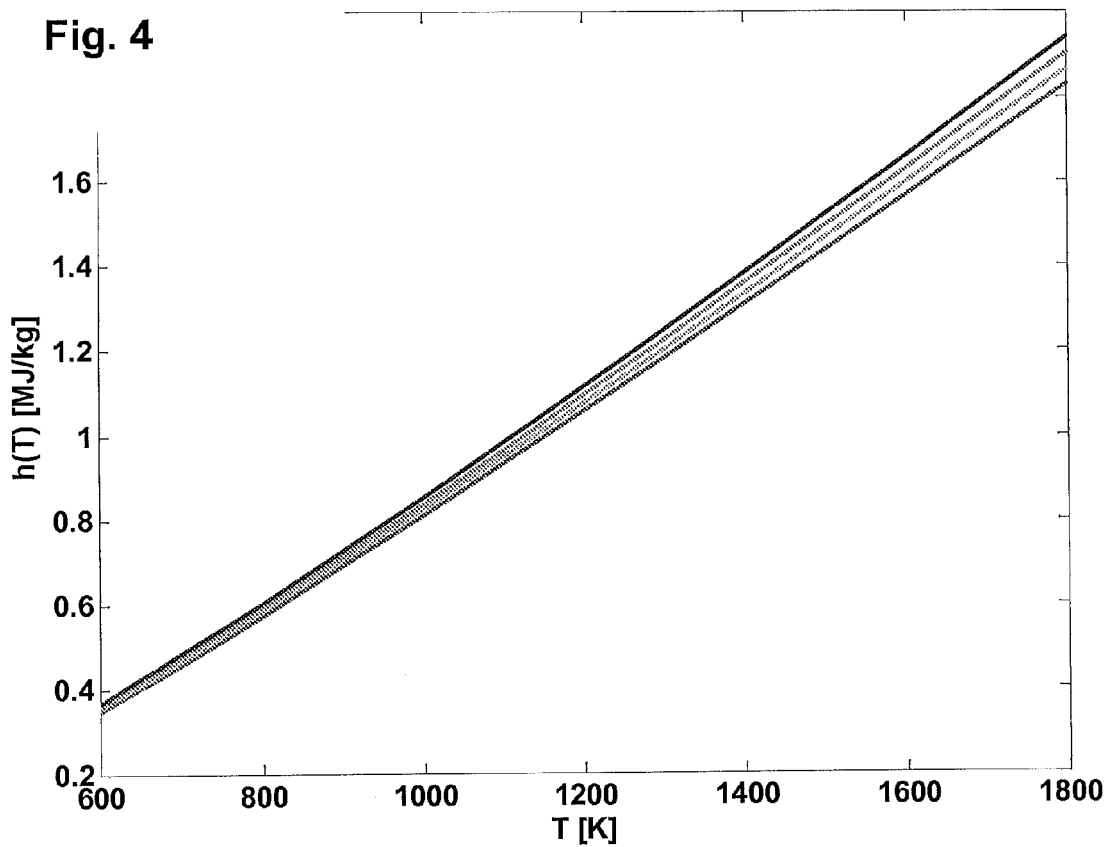
FIG. 4 depicts exemplary compound enthalpies for four distinct gas compositions.

These enthalpy functions are polynomials of higher order and are, for example, only temperature dependent. FIG. 4 depicts examples of compound enthalpies $h(T)$ for four distinct gas compositions, as obtained from the NASA site. In equation (3), the terms $w_g \cdot [h_g(T_3) - h_g(T_4)]$ and $w_a$ are unknown, as $w_g$, $T_3$ and $\underline{m}_g$ are unknown. In a first step, $w_a$ is derived. With reference to FIG. 2, the product $w_g h_g(T_3)$ is calculated from the enthalpies that enter the combustion process. Hence, $$w_g \cdot h_g(T_3) = w_a \cdot h_a(T_2) + w_f \cdot h_f(T_f) + w_f \Delta h_f. \quad (5)$$

While the GT is operated with gas, the water injection ($w_w$) is neglected in the present example. However, one skilled in the art will understand that the equations can be extended easily to include the water injection. Likewise, pressures and flow speeds are not incorporated, but could be included in a corresponding extension. The term $\Delta h_f$ is the heating value (or heat rate) of the fuel gas and can be calculated from the enthalpy of formation (according to Hess's law) of each gas component ($\Delta \underline{h}$). Hence, $$\Delta h_f = \underline{m}_f^T \cdot \Delta \underline{h}. \quad (6)$$

The exhaust gas enthalpy flow after the turbine is $w_g h_g(T_4)$. Hence, $$w_g \cdot h_g(T_4) = w_g \cdot \underline{m}_g^T \cdot \underline{h}(T_4) \quad (7)$$

$$w_g \cdot h_g(T_4) = (w_a \cdot \underline{m}_a + w_f \cdot V \cdot \underline{m}_f)^T \cdot \underline{h}(T_4) \quad (8)$$

$$w_g \cdot h_g(T_4) = w_a \cdot \underline{m}_a^T \cdot \underline{h}(T_4) + w_f \cdot (V \cdot \underline{m}_f)^T \cdot \underline{h}(T_4) \quad (9)$$

Whereby V is the combustion matrix describing the stoichiometric relation for each component. For example, the complete combustion of Methene and Ethene is covered by the following matrix calculation:

$$\begin{pmatrix} Y_g(O_2) \\ Y_g(CO_2) \\ Y_g(H_2O) \\ Y_g(CH_4) \\ Y_g(C_2H_6) \end{pmatrix} = \underbrace{\begin{bmatrix} 1 & 0 & 0 & -2 & -\frac{5}{2} \\ 0 & 1 & 0 & 1 & 2 \\ 0 & 0 & 1 & 2 & 3 \\ 0 & 0 & 0 & 0 & 0 \\ 0 & 0 & 0 & 0 & 0 \end{bmatrix}}_{V} \cdot \begin{pmatrix} y_{a+f}(O_2) \\ y_{a+f}(CO_2) \\ y_{a+f}(H_2O) \\ y_{a+f}(CH_4) \\ y_{a+f}(C_2H_6) \end{pmatrix} \quad (10)$$

$$w_g \cdot \underbrace{\begin{pmatrix} m_{g,O_2} \\ m_{g,CO_2} \\ m_{g,H_2O} \\ m_{g,CH_4} \\ m_{g,C_2H_6} \\ \vdots \end{pmatrix}}_{\underline{m}_g} = w_a \cdot \underbrace{\begin{pmatrix} m_{a,O_2} \\ m_{a,CO_2} \\ m_{a,H_2O} \\ m_{a,CH_4} \\ m_{a,C_2H_6} \\ \vdots \end{pmatrix}}_{\underline{m}_a} + \quad (10')$$

$$w_f \cdot \mathrm{diag}(\underline{M}) \underbrace{\begin{bmatrix} 1 & 0 & 0 & -2 & -\frac{5}{2} & \cdots \\ 0 & 1 & 0 & 1 & 2 & \cdots \\ 0 & 0 & 1 & 2 & 3 & \cdots \\ 0 & 0 & 0 & 0 & 0 & \cdots \\ 0 & 0 & 0 & 0 & 0 & \cdots \\ \vdots & \vdots & \vdots & \vdots & \vdots & \ddots \end{bmatrix}}_{V} \mathrm{diag}^{-1}(\underline{M}) \cdot \underbrace{\begin{pmatrix} m_{f,O_2} \\ m_{f,CO_2} \\ m_{f,H_2O} \\ m_{f,CH_4} \\ m_{f,C_2H_6} \\ \vdots \end{pmatrix}}_{\underline{m}_f}$$

The vector $\underline{M}$ contains the corresponding molar masses and $\mathrm{diag}(\underline{M})$ is a matrix with the elements of $\underline{M}$ on its diagonal. The first row in V can be read as the amount of $O_2$ molecules in the educt minus two times amount of $CH_4$ molecules minus 2.5 times the amount of $C_2H_6$ molecules yields the amount of $O_2$ molecules in the product. Correspondingly, the second row reads as the amount of $CO_2$ in the educt plus once the amount of molecules of $CH_4$ plus twice the amount of molecules of $C_2H_6$ yields the $CO_2$ amount in the product. Hence, equation (3) can be rewritten as $$P_{mech} + P_{loss} = w_f \cdot h_f(T_f) + w_f \cdot \Delta h_f - w_f \cdot (V \cdot \underline{m}_f)^T \cdot \underline{h}(T_4) \ldots$$
$$+ w_a \cdot h_a(T_0) - w_a \cdot \underline{m}_a^T \cdot \underline{h}(T_4) \quad (11)$$

yielding $$w_a = \frac{P_{mech} + P_{loss} - w_f \cdot \left( \begin{array}{c} h_f(T_f) + \Delta h_f - \\ (V \cdot \underline{m}_f)^T \cdot \underline{h}(T_4) \end{array} \right)}{h_a(T_0) - \underline{m}_a^T \cdot \underline{h}(T_4)} \quad (12)$$

All variables on the right hand side are known. Subsequently, the exhaust gas flow can be derived as $$w_g = w_a + w_f \quad (13)$$

and the exhaust gas composition $\underline{m}_g$ is derived as $$\underline{m}_g = V \frac{w_a \underline{m}_a + w_f \underline{m}_f}{\underbrace{w_a + w_f}_{=w_g}}, \quad (14)$$

Because the enthalpy functions are monotonic (and therefore invertible), the turbine inlet temperature $T_3$ can be derived easily by inverting the corresponding enthalpy function from equation (5):

$$T_3 = h_g^{-1}\left( \frac{w_a \cdot h_a(T_2) + w_f \cdot h_f(T_f) + w_f \cdot \Delta h_f}{w_a + w_f} \right). \quad (13)$$

Figure 5:
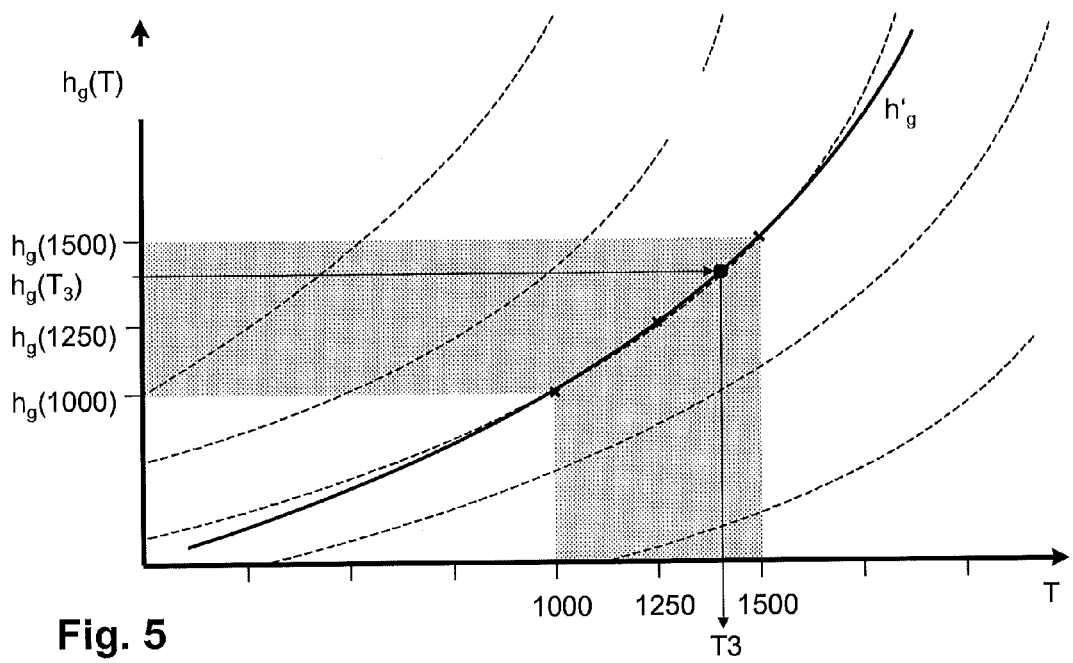
FIG. 5 depicts an exemplary manner by which a turbine inlet temperature is determined from an enthalpy line.

The inversion is schematically depicted in FIG. 5, where (due to monotonicity) the temperature $T_3$ is found corresponding to a particular enthalpy. Five distinct enthalpy lines for constant exhaust gas compositions are depicted (broken lines), one of them being approximated by a $2^{nd}$ order polynominal $h'_g$ in the relevant temperature range between 1000 and 1500 K (shaded area). As the approximation is seen to work reasonably well, in practice, the interpolating low order polynomials are inverted for the purpose of deriving $T_3$.

The method is implemented, for example, on an industrial control system 1 for monitoring the unmeasured process states and/or for controlling the turbine inlet temperature $T_3$. Due to the fact that the combustion is taken into account, $CO_2$ emissions can be derived directly through the calculation. Furthermore, the method can be extended for supervising the quality of fuel input. Properties of specific gas components, such as $CO_2$ or $NO_x$, are often measured in the exhaust gas for regulatory reasons. Having available both, a measurement and an estimation (based on the above determination), provides information on the quality of combustion, quality of fuel input and/or sensor failure, leading to enhanced diagnostics of the combustion system.

For example, the system 1 comprises a sensor module 11 for receiving measurements of process variables and/or educt composition(s); a data and program memory 12 for storing measurement values, calculation parameters and programmed software modules; a processing unit 13 with at least one processor; and an output module 14 for displaying processing states and/or for proving, to the gas turbine 2 or to a control unit controlling the gas turbine 2, control signals based on the derived processing states. In an embodiment, the program memory 12 comprises a programmed software module for controlling the processing unit such that the method is executed as described in the following paragraphs with reference to FIG. 3.

In step S1, measurements are taken and respective measurement values are received by sensor module 11 and stored in the system 1.

In step S2, the processing unit 13 computes the air mass flow $w_a$ using equation (12), as described above.

In step S3, the processing unit 13 computes the exhaust gas mass flow $w_g$ and exhaust gas composition $\underline{m}_g$ using equations (13) or (14), respectively.

In step S4, the processing unit 13 computes the enthalpy inversion $h_g^{-1}$.

In step S5, the processing unit 13 computes the turbine inlet temperature $T_3$ using equation (15) as described above.

Figure 3:
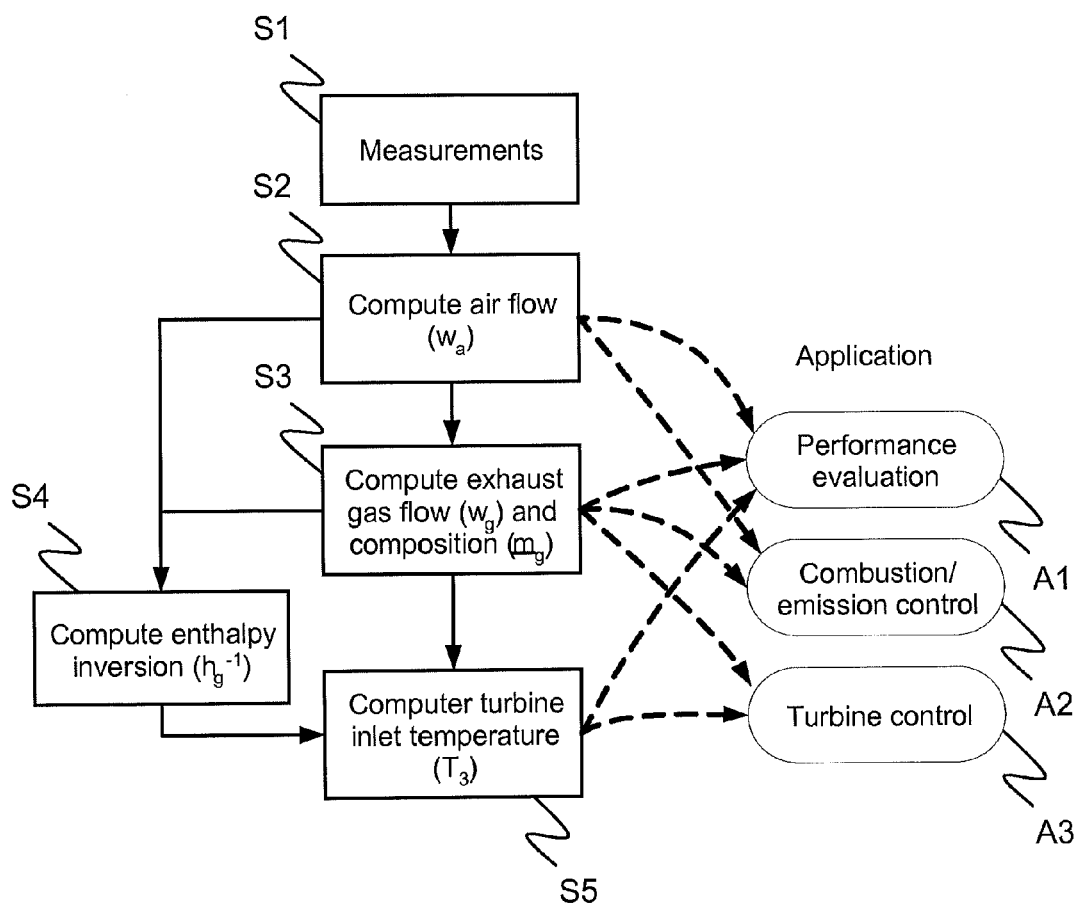
FIG. 3 shows an exemplary sequence of steps for monitoring process states of a rotating machine having a combustion chamber.

As is also illustrated in FIG. 3, the computer process states, e.g. the air mass flow $w_a$, the exhaust gas mass flow $w_g$, the exhaust gas composition $\underline{m}_g$, and/or the turbine inlet temperature $T_3$, are used by the output module 14 for applications of performance evaluation A1, combustion/emission control A2, and/or turbine control A3.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method of monitoring at least one process state of an internal combustion engine having a combustion chamber, the method comprising:
    measuring compositions of educts ($m_a$, $m_f$) entering a combustion chamber;
    determining, based on the compositions of the educts ($m_a$, $m_f$), a composition of a product produced by the combustion chamber;
    determining mechanical power ($P_{mech}$) generated by the internal combustion engine;
    determining a value of at least one process state based on the mechanical power ($P_{mech}$), the composition of the educts ($m_a$, $m_f$) and product, and stoichiometric relationships of educts and product; and
    measuring temperatures of the educts and product, and determining enthalpies for the educts and product using enthalpy functions associated with their respective compositions, wherein determining the enthalpies for educts and product is based on their respective temperatures, and wherein determining the value of the at least one process state is based on the enthalpies.

2. The method according to claim 1, wherein determining the value of the at least one process state includes:
    determining at least one of an air mass flow ($w_a$) through a compressor leading into the combustion chamber, and a gas mass flow ($w_g$), a composition ($m_g$) and a temperature ($T_3$) of exhaust gas exiting the combustion chamber and/or entering a turbine.

3. A method of monitoring at least one process state according to claim 1, comprising:
    determining a composition of a product (mg) produced by the combustion chamber, based on the compositions of the educts (ma, mf); and
    deriving, from the composition, information on a quality of combustion or a quality of fuel input, or information about a sensor failure.

4. The method according to claim 1, wherein the internal combustion engine is a rotating machine having the combustion chamber.

5. A method of monitoring at least one process state of an internal combustion engine having a combustion chamber, the method comprising:
    measuring compositions of educts ($m_a$, $m_f$) entering a combustion chamber;
    determining, based on the compositions of the educts ($m_a$, $m_f$), a composition of a product produced by the combustion chamber;
    determining mechanical power ($P_{mech}$) generated by the internal combustion engine;
    determining a value of at least one process state based on the mechanical power ($P_{mech}$), the composition of the educts ($m_a$, $m_f$) and product, and stoichiometric relationships of educts and product;
    monitoring the process states of a gas turbine, wherein determining the value of the at least one process state includes:
    determining an air mass flow ($w_a$) through a compressor leading into the combustion chamber;
    determining a gas mass flow ($w_g$) of exhaust gas exiting the combustion chamber based on the air mass flow ($w_a$) and a fuel mass flow ($w_f$) into the combustion chamber;
    determining a composition of the exhaust gas ($m_g$) based on the air mass flow ($w_a$) and the gas mass flow ($w_g$); and
    determining a temperature ($T_3$) of the exhaust gas exiting the combustion chamber based on the air mass flow ($w_a$), the gas mass flow ($w_g$), and the composition of the exhaust gas ($m_g$), the temperature ($T_3$) of the exhaust gas exiting the combustion chamber being representative of an inlet temperature of the turbine driven by the exhaust gas exiting the combustion chamber.

6. The method according to claim 5, wherein determining the temperature ($T_3$) of the exhaust gas includes:

determining an inverted enthalpy function associated with the composition of the exhaust gas ($m_g$), and determining the temperature ($T_3$) of the exhaust gas exiting the combustion chamber based on the air mass flow ($w_a$) and the gas mass flow ($w_g$) using the inverted enthalpy function.

7. The method according to claim 5, comprising:
measuring temperatures ($T_2$, $T_f$) of air and fuel entering the combustion chamber;
measuring the temperature of the exhaust gas exiting the turbine; and
determining enthalpies ($h_a$, $h_f$, $h_g$) for air, fuel and exhaust gas based on their respective temperatures, wherein determining the value of the at least one process state is based on the enthalpies ($h_a$, $h_f$, $h_g$).

8. A system for monitoring at least one process state of an internal combustion engine having a combustion chamber, the system comprising:
a sensor module for receiving measurements of compositions of educts ($m_a$, $m_f$) entering the combustion chamber;
a processing unit for computing a composition of a product produced by the combustion chamber based on the compositions of the educts ($m_a$, $m_f$);
computing a mechanical power ($P_{mech}$) generated by the internal combustion engine; and
computing a value of at least one process state based on the mechanical power ($P_{mech}$), the composition of the educts ($m_a$, $m_f$) and product, and stoichiometric relationships of educts and product;
wherein the at least one process state includes at least one of an air mass flow ($w_a$) through a compressor leading into the combustion chamber, and a gas mass flow ($w_g$), a composition ($m_g$) and a temperature ($T_3$) of exhaust gas exiting the combustion chamber, and
wherein the means for determining the value of the at least one process state are configured to determine the air mass flow ($w_a$) through the compressor leading into the combustion chamber, to determine the gas mass flow ($w_g$) of exhaust gas exiting the combustion chamber based on the air mass flow ($w_a$) and a fuel mass flow ($w_f$) into the combustion chamber, to determine a composition of the exhaust gas ($m_g$) based on the air mass flow ($w_a$) and the gas mass flow ($w_g$), and to determine a temperature ($T_3$) of the exhaust gas exiting the combustion chamber based on the air mass flow ($w_a$), the gas mass flow ($w_g$), and the composition of the exhaust gas ($m_g$), the temperature ($T_3$) of the exhaust gas exiting the combustion chamber being representative of an inlet temperature of the turbine driven by the exhaust gas exiting the combustion chamber.

9. The system according to claim 8, wherein the internal combustion engine is a rotating machine configured as a gas turbine.

10. The system according to claim 8, comprising:
means for measuring temperatures ($T_2$, $T_f$) of air and fuel entering the combustion chamber;
means for measuring the temperature of the exhaust gas exiting the turbine; and
means for determining enthalpies ($h_a$, $h_f$, $h_g$) for air, fuel and exhaust gas based on their respective temperatures, wherein the means for determining the value of the at least one process state are configured to determine the value of the at least one process state based on the enthalpies ($h_a$, $h_f$, $h_g$).

* * * * *